Nov. 11, 1969  MIYAJI TOMOTA  3,478,256
CAPACITOR POTENTIOMETER
Filed Oct. 18, 1967
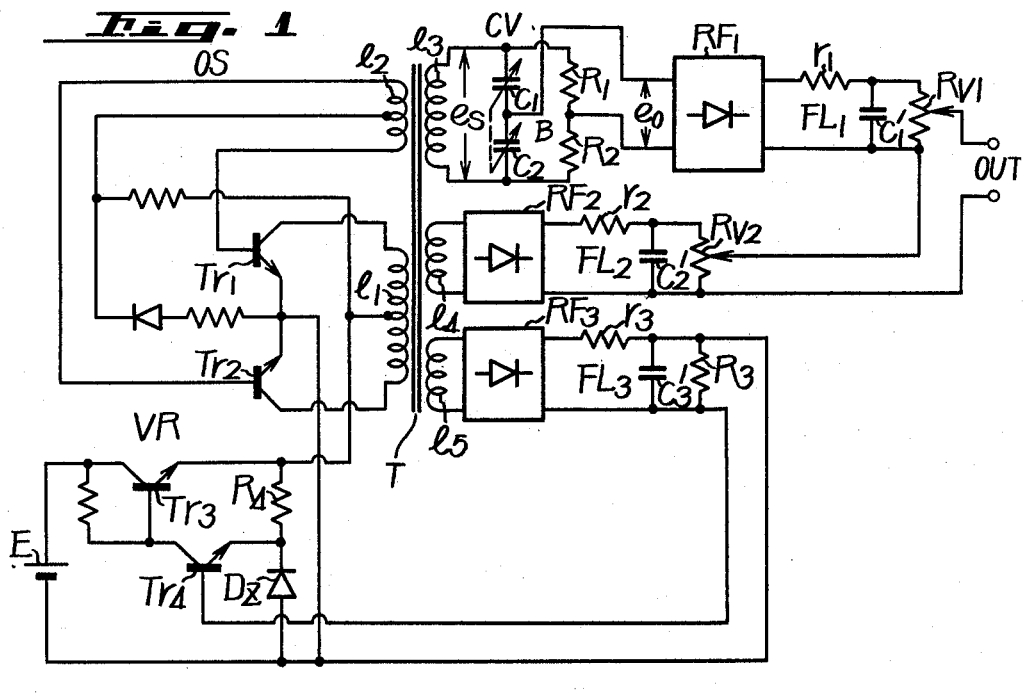
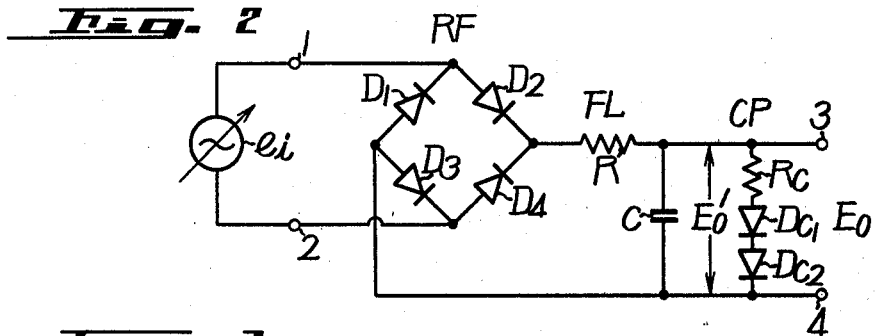
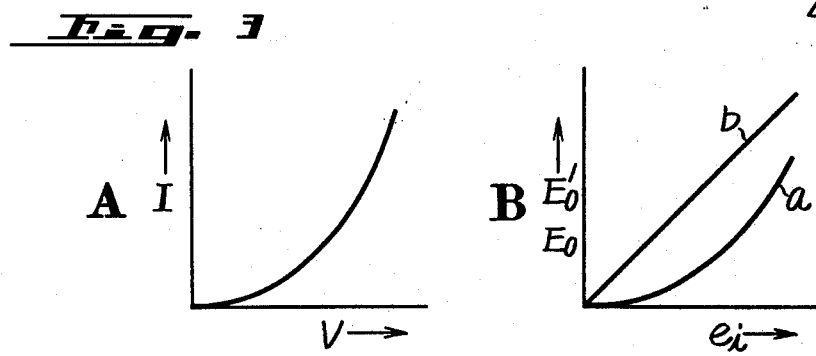
INVENTOR.
Miyaji Tomota
BY *Hill, Sherman, Meroni, Gross & Simpson* ATTORNEYS United States Patent Office 3,478,256
Patented Nov. 11, 1969

3,478,256
CAPACITOR POTENTIOMETER
Miyaji Tomota, Tokyo, Japan, assignor to Kabushiki-kaisha Yokogawa Denki Seisakusho, Tokyo, Japan
Filed Oct. 18, 1967, Ser. No. 676,317
Claims priority, application Japan, Nov. 15, 1966, 41/75,072
Int. Cl. H02m 3/22, 5/40
U.S. Cl. 321—2
4 Claims

ABSTRACT OF THE DISCLOSURE

A capacitor potentiometer having a transistor DC-AC converter for converting a DC-voltage into an AC signal having a certain amplitude, an impedance circuit including two variable capacitors connected differentially with each other for changing mechanical motion into an electrical signal and a rectifier circuit for rectifying an output voltage of the impedance circuit.

BACKGROUND OF THE INVENTION

Field of the invention

This invention relates to a capacitor potentiometer employing variable capacitors for generating a standard voltage or to a non-contact type standard voltage generating apparatus which is suitable for use, for example, in the production of a balancing voltage for an automatic balancing-type recording instrument and avoids defects experienced in the prior art.

Description of the prior art

In conventional automatic balancing-type recording instruments, the difference between an input DC voltage and a standard voltage is amplified by an amplifier; a balancing motor is driven by an output signal of the amplifier to shift a slider of a slide rheostat to obtain a voltage balancing with the input signal; and the value of the input signal is known from the position of the slider.

However, the slide rheostat usually employed for producing the balancing voltage in the conventional automatic balancing-type recording instruments presents problems in its reliability and durability as the contacts of its slider are likely to be worn away and bad in contact.

SUMMARY OF THE INVENTION

This invention is directed to a non-contact type standard voltage generating apparatus which is free from the drawbacks encountered in the prior art.

The primary object of this invention is to provide a highly-precision capacitor potentiometer or a non-contact type standard voltage-generating apparatus for producing a DC voltage in response to external displacements which comprises a constant-voltage AC oscillator, a voltage divider circuit including a differential capacity changer connected to the output side of the oscillator and varying its capacity in response to external displacements, and a rectifier circuit for rectifying an output voltage of the voltage divider circuit to obtain a DC voltage, and which substantially eliminates the defects in the prior art.

Other objects, features and advantages of this invention will be apparent from the following description taken in conjunction with the accompanying drawings.

BRIEF DESCRIPTION OF THE DRAWING

FIGURE 1 is a connection diagram schematically illustrating one embodiment of a capacitor potentiometer produced according to this invention;

FIGURE 2 is a connection diagram schematically illustrating one example of a rectifier circuit employed in this invention; and FIGURES 3A and 3B are graphs for explaining the operation of the circuit exemplified in FIGURE 2.

DESCRIPTION OF THE PREFERRED EMBODIMENT

In FIGURE 1 there is illustrated one example of a capacitor potentiometer of this invention, in which reference character OS indicates a current-saturation type transistor oscillator comprising transistors $Tr_1$ and $Tr_2$ and a transformer T, and E a DC power source. The transformer T includes a primary winding $l_1$, a secondary winding $l_2$ and output windings $l_3$, $l_4$ and $l_5$. Reference character VR designates a voltage control circuit consisting of transistor $Tr_3$ and $Tr_4$, a Zener diode $D_z$ and a resistor $R_4$, which controls an output voltage of the DC power source E. Reference character CV identifies a differential capacity changer including two variable capacitors $C_1$ and $C_2$ which are interlockingly driven to vary their capacities in a differential manner. Reference characters $RF_1$, $RF_2$ and $RF_3$ represent rectifier circuits each including a semiconductor diode, $FL_1$, $FL_2$ and $FL_3$ smoothing circuits each consisting of a resistor and a capacitor, $R_{V1}$ and $R_{V2}$ resistance voltage dividers, and $R_1$ and $R_2$ resistance elements connected in series to each other and connected in parallel to the variable capacitors $C_1$ and $C_2$.

An output terminal of the DC power source E is connected through the voltage control circuit VR to a supply source terminal of the oscillator OS. The output winding $l_3$ of the transformer T of the oscillator OS has connected thereto a series circuit of the differential capacity changer CV consisting of the variable capacitors $C_1$ and $C_2$ and a series circuit of the resistors $R_1$ and $R_2$. The connecting point between the variable capacitors $C_1$ and $C_2$ of the differential capacity changer CV and the connecting point between the resistors $R_1$ and $R_2$ are connected across the input terminals of the rectifier circuit $RF_1$. Output terminals of the rectifier circuit $RF_1$ are connected across input terminals of the resistance voltage divider $R_{V1}$ through the smoothing circuit $FL_1$ consisting of a resistor $r_1$ and a capacitor $C_1'$. The output winding $l_4$ of the transformer T is connected between the input terminals of the rectifier circuit $RF_2$, whose output terminals, in turn, are connected across input terminals of the resistance voltage divider $R_{V2}$ through the smoothing circuit $FL_2$ consisting of a resistor $r_2$ and a capacitor $C_2'$. An output terminal of each of the resistance voltage dividers $R_{V1}$ and $R_{V2}$ is connected in series to an output terminal labelled "out" in such a manner that an output voltage appearing at each voltage divider is added with that of the other. The output winding $l_5$ of the transformer T is connected to the input side of the rectifier circuit $RF_3$ whose output side, in turn, is connected across control signal input terminals of the voltage control circuit VR through the smoothing circuit $FL_3$ consisting of a resistor $r_3$ and a capacitor $C_3'$ and the resistor $R_3$.

A description will be given in connection with the operation of the capacitor potentiometer constructed as above described.

The oscillator circuit OS is caused to oscillate by an output voltage applied to its power supply terminal from the voltage control circuit VR. The amplitude of the output voltage of the oscillator circuit OS is controlled within a certain range according to the value of the voltage applied to the power supply terminal. One portion of an output signal of the oscillator OS is picked up by the output winding $l_5$ of the transformer T, after which the picked-up signal is rectified by the rectifier circuit $RF_3$, smoothed by the smoothing circuit $FL_3$ to be converted into a DC voltage in proportion to the value of an AC output voltage of the oscillator circuit OS, thereafter being impressed to the control signal input terminal of the voltage control circuit VR. In the voltage control circuit VR the aforementioned DC voltage is compared with a terminal voltage of the reference Zener diode $D_Z$ by the transistor $Tr_4$, by the output of which the transistor $Tr_3$ is controlled to adjust the output voltage of the voltage control circuit VR, thus controlling the output voltage of the oscillator circuit OS so that the aforementioned DC voltage may be equal to the terminal voltage of the Zener diode $D_Z$. As a result of this, the amplitude of the AC output voltage of the oscillator circuit OS is always held at a certain value corresponding to the standard voltage appearing across the terminals of the Zener diode $D_Z$.

In the differential capacity changer CV the variable capacitors $C_1$ and $C_2$ are formed symmetrical, which are ganged with each other to be differentially driven. If now a displacement or rotational angle of each capacitor is $\theta$, the capacities $C_{p1}$ and $C_{p2}$ of the capacitors $C_1$ and $C_2$ respectively vary based on the following equations:

$$C_{p1} = C_o + k\theta$$
$$C_{p2} = C_o - k\theta$$

where $k$ is a constant and $C_o$ is the capacity of each of the capacitors $C_1$ and $C_2$ when $\theta = 0$, and the capacities of the capacitors $C_1$ and $C_2$ under this condition are set equal to each other.

The capacitors $C_1$ and $C_2$ of the differential capacity changer CV and the resistors $R_1$ and $R_2$ constitute a bridge circuit B, across the input terminals of which the output voltage of the oscillator circuit OS is impressed through the output winding $l_3$ of the transformer T.

If the impedance of the output winding $l_3$ of the transformer T or the internal impedance of the oscillator circuit OS is set small and the load impedance of the bridge circuit B is set great, an AC voltage $e_0$ appearing at the output terminal of the bridge circuit or impressed to the input terminals of the rectifier circuit $RF_1$ is expressed by the following equation:

$$e_0 = e_s \cdot \left[ \frac{\frac{1}{j\omega C_{p2}}}{\frac{1}{j\omega C_{p1}} + \frac{1}{j\omega C_{p2}}} - \frac{R_2}{R_1 + R_2} \right]$$

$$= e_s \cdot \left( \frac{C_{p1}}{C_{p1} + C_{p2}} - \frac{R_2}{R_1 + R_2} \right)$$

$$= e_s \cdot \left( \frac{C_0 + k\theta}{2C_0} - \frac{R_2}{R_1 + R_2} \right)$$

where $e_s$ is an output voltage of the output winding $l_3$.

In this case, if the rotational angle $\theta$ of the capacitors $C_1$ and $C_2$ is set to be $\pm \theta_0$ and $$\frac{C_0 - k\theta_0}{2C_0}$$

is set equal to $$\frac{R_2}{R_1 + R_2}$$

the AC voltage $e_0$ is given by the following equation:

$$e_0 = e_s \frac{k(\theta + \theta_0)}{2C_0}$$

As is apparent from the above equation, the output voltage $e_0$ of the bridge circuit B is in proportion to the rotational angle $\theta$ of the capacitors $C_1$ and $C_2$ of the differential capacity changer CV. Further, the output voltage $e_0$ is independent of a factor such as a frequency and hence is not affected by the variations in the frequency of the oscillator circuit OS.

The output voltage $e_0$ of the bridge circuit B produced in proportion to the aforementioned rotational angle $\theta$ is rectified by the rectifier circuit $RF_1$ and is smoothed by the smoothing circuit $FL_1$ to be converted into a DC voltage proportional to the output voltage $e_0$, thereafter being impressed across the input terminals of the resistance voltage divider $R_{V1}$. With a suitable setting of the voltage dividing value of the resistance voltage divider $R_{V1}$ by adjusting its slider, the rate (span) of the variations in the DC output voltage with respect to the rotational angle of the differential capacity changer CV can be set as desired.

The output voltage of the resistance voltage divider $R_{V2}$ is for adjustment of the zero point of the output voltage fed to the output terminal "out." In this embodiment the output of the output winding $l_4$ of the transformer T is rectified by the rectifier circuit $RF_2$ and is smoothed by the smoothing circuit $FL_2$ to obtain a certain DC voltage. The resulting DC voltage is divided at a desired value by the resistance voltage divider $F_{V2}$ and is added to the output voltage of the resistance voltage divider $R_{V1}$, thus adjusting the zero point of the output voltage impressed to the output terminal labelled "out."

When an AC voltage is rectified for obtaining a DC voltage proportional to the AC voltage, if the value of the AC voltage is small, the output DC voltage sometimes cannot be produced in proportion to the input AC voltage due to the non-linear characteristic of the diode included in the rectifier circuit. This defect can be eliminated by the provision of such a compensating circuit as shown in FIGURE 2 in the rectifier-smoothing circuit in FIGURE 1.

A description will be given in connection with the compensating circuit and the operation thereof. In FIGURE 2 reference character RF designates a rectifier circuit consisting of diodes $D_1$ to $D_4$, FL a smoothing circuit consisting of a resistor R and a capacitor C, and CP a compensating circuit consisting of a series circuit of diodes $D_{O1}$ and $D_{C2}$ and a resistor $R_c$ and connected across output terminals of the smoothing circuit FL.

The operation of the compensating circuit depicted in FIGURE 2 will be described in connection with a case where an AC voltage $e_i$ is impressed across input terminals 1 and 2 of the rectifier circuit RF. In this case, a current flows to the smoothing circuit FL in a certain direction through diodes $D_2$ and $D_3$ during every half cycle when the terminal 1 is made positive and through diodes $D_1$ and $D_4$ during every half cycle when the terminal 1 is made negative, obtaining a rectified output across output terminals 3 and 4. FIGURE 3A is a graph showing a forward current-voltage characteristic of the diodes $D_1$ to $D_4$ of the rectifier circuit RF exemplified in FIGURE 2, the abscissa representing an impressed voltage V and the ordinate a current I. It appears from the graph of FIGURE 3A that the voltage V and the current I flowing through the diodes are in non-linear relation when the value of the impressed voltage V is small. FIGURE 3B is a graph showing the relations of the AC input voltage $e_i$ of the circuit depicted in FIGURE 2 to the DC output voltage $E_0'$ of the smoothing circuit FL and the voltage $E_0$ appearing across the output terminals 3 and 4, the abscissa representing the AC input voltage $e_i$ and the ordinate the DC outputs $E_0'$ and $E_0$. As is apparent from from a curve $a$ representing $E_0'-e_i$ characteristic, the relation between the AC input voltage $e_i$ and the DC output voltage $E_0'$, produced by rectifying the voltage $e_i$, varies in a non-linear manner when the value of the AC input voltage $e_i$ is small and the value of the series resistor R connected to the diodes is small. In order to compensate for this non-linear characteristic, the compensating circuit CP consisting of the series circuit of the diodes $D_{C1}$ and $D_{C2}$ and the resistor $R_C$ is interposed between the output terminals of the smoothing circuit FL. The diodes of the compensating circuit CP exhibit a non-linear characteristic similar to that of the diodes of the rectifier circuit RF, so that the non-linear characteristic of the rectified voltage produced by the diodes of the rectifier circuit RF, such as indicated by the curve $a$, is cancelled by the non-linear characteristic of the diodes of the compensating circuit CP. As a result of this, the DC voltage $E_0$ produced across the output terminals 3 and 4 is proportionate to the AC input voltage $e_i$, as indicated by a curve $b$ in FIGURE 3B, even when the value of the AC input voltage $e_1$ is small. Since the rectifier circuit RF is a full-wave rectifier circuit and two diodes operate in forward direction during every half cycle, the two diodes are employed in the compensating circuit CP to compensate for the temperature characteristics of the diodes at the time of forward voltage drop of the diodes.

As will be clearly seen from the foregoing, the capacitor potentiometer of this invention employs a transistor oscillator of high frequency, and hence is small in power consumption and is almost free from adverse influences such as noise to ground and so on.

The present invention provides a non-contact type potentiometer of relatively small construction which is high-precision, highly reliable and long-lived.

It will be apparent that many modifications and variations may be effected without departing from the novel concepts of this invention.

I claim as my invention:

1. A capacitor potentiometer comprising a DC power source; a transistor-fed DC-AC converter including a transistor and a transformer having a plurality of output windings, said transistor-fed DC-AC converter converting the DC voltage of said DC power source into an AC voltage; a control circuit including a Zener diode and a control transistor, said control circuit comparing output voltage obtained at one of said plurality of output windings of said DC-AC converter with that across said Zener diode to control the voltage from said DC power source by means of said control transistor to obtain a substantially constant voltage from said DC-AC converter; a bridge circuit consisting of a pair of series connected variable capacitors and a pair of series connected resistors, said pair of resistors and capacitors connected in parallel, the junctions of said pair of resistors and capacitors connected across another one of said plurality of output windings of said transformer of said DC-AC converter, means for differentially varying the capacitances of said pair of capacitors, and a first rectifier circuit connected across the junction between said pair of variable capacitors and the junction point of said pair of resistors, whereby a DC output voltage can be obtained from said rectifier circuit which varies as a function of the means for varying the capacitances.

2. A capacitor potentiometer as claimed in claim 1, in which a compensating circuit is connected across the output of said rectifier circuit, said compensating circuit composed of a resistor and a first diode connected in series.

3. A capacitor potentiometer as claimed in claim 2 comprising a second diode in said compensating circuit connected in series with the first diode and the resistor.

4. A capacitor potentiometer according to claim 1 comprising a second rectifier circuit connected to a third output winding of said transformer, and the output of said second rectifier circuit connected to the output of the first rectifier circuit to produce a compensated output.

References Cited

UNITED STATES PATENTS

| 2,274,735 | 3/1942 | Peters et al. | 340—200 |
| 2,548,790 | 4/1951 | Higinbotham et al. | 340—200 |
| 3,044,013 | 7/1962 | Peck | 323—79 X |
| 3,121,839 | 2/1964 | Malinick et al. | 323—75 |
| 3,327,199 | 6/1967 | Gardner et al. | 321—2 |
| 3,350,623 | 10/1967 | Clapp | 321—8 |

JOHN F. COUCH, Primary Examiner

W. H. BEHA, JR., Assistant Examiner

U.S. Cl. X.R.

321—8; 323—75; 340—200